(12) United States Patent
Jestes, Jr.

(10) Patent No.: US 7,440,468 B2
(45) Date of Patent: Oct. 21, 2008

(54) QUEUE MANAGEMENT OF A GLOBAL LINK CONTROL BYTE IN AN INPUT/OUTPUT SUBSYSTEM

(75) Inventor: Roger C. Jestes, Jr., Pougkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 10/734,033

(22) Filed: Dec. 11, 2003

(65) Prior Publication Data

US 2005/0129041 A1   Jun. 16, 2005

(51) Int. Cl.
*H04L 12/28* (2006.01)

(52) U.S. Cl. ....................................................... 370/412
(58) Field of Classification Search .................. 370/412
See application file for complete search history.

(56) References Cited

U.S. PATENT DOCUMENTS

| | | | | |
|---|---|---|---|---|
| 5,272,702 A | | 12/1993 | Snowbarger et al. ....... 370/85.4 |
| 5,455,830 A | * | 10/1995 | Gregg et al. ................. 714/700 |
| 5,455,831 A | | 10/1995 | Bartow et al. ................... 371/1 |
| 5,568,526 A | | 10/1996 | Ferraiolo et al. ............. 375/356 |
| 5,610,945 A | | 3/1997 | Gregg et al. ................. 375/260 |
| 5,649,291 A | | 7/1997 | Tayloe ......................... 370/322 |
| 5,832,310 A | * | 11/1998 | Morrissey et al. .............. 710/71 |
| 5,944,797 A | | 8/1999 | Gregg et al. ................. 709/237 |
| 5,948,060 A | | 9/1999 | Gregg et al. ................... 709/12 |

* cited by examiner

*Primary Examiner*—Suk Jin Kang
(74) *Attorney, Agent, or Firm*—Floyd Gonzalez; John E. Campbell

(57) ABSTRACT

Method and apparatus for communicating global link control words (LCW) between chips. A queue stores LCWs and has in input for receiving an LCW from a previous chip, and an output for outputting a stored LCW to a subsequent chip. A management circuit compares an incoming LCW with a previously stored LCW, and a combiner circuit combines the incoming LCW with a previously stored LCW and stores the combined LCW in the queue when the management circuit determines that the incoming LCW can be combined with the previously stored LCW.

5 Claims, 4 Drawing Sheets

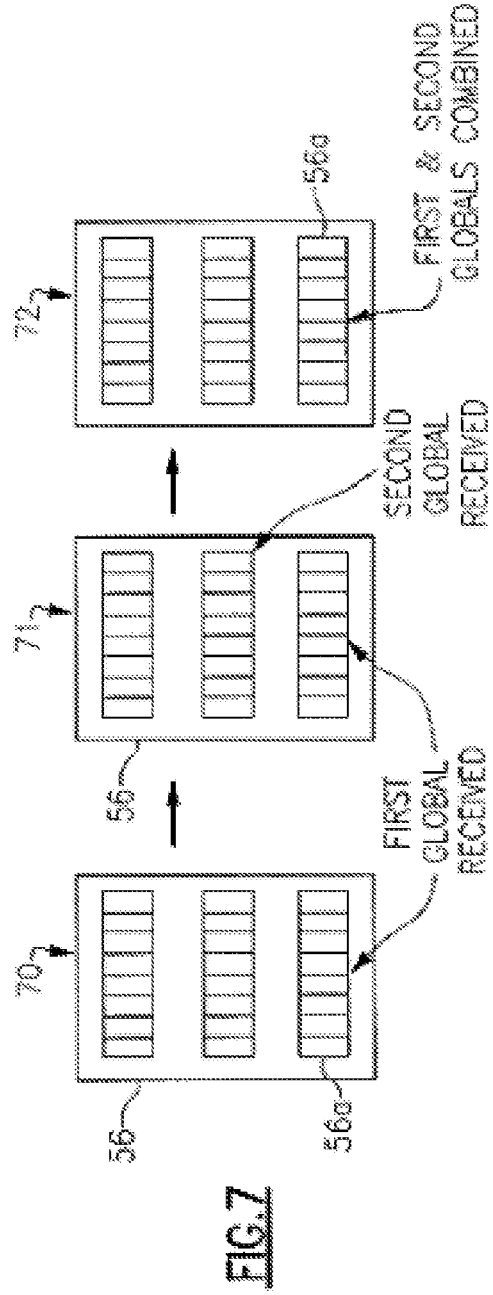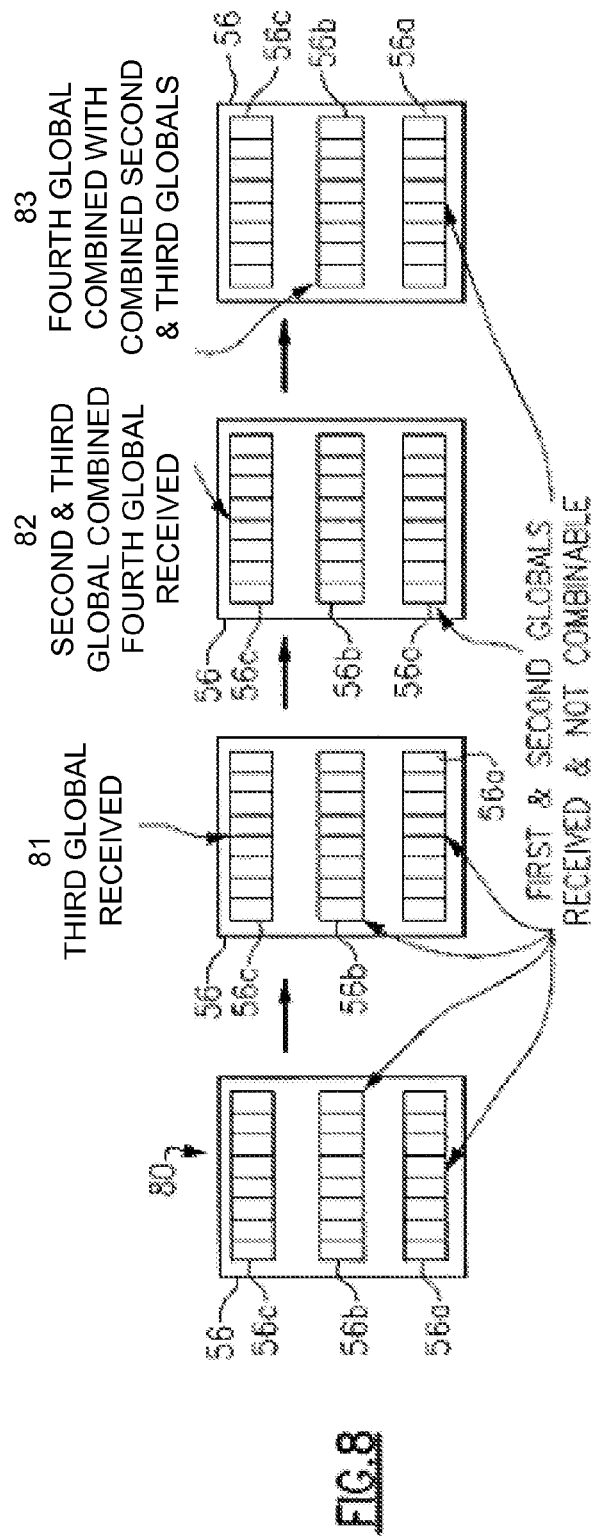

QUEUE MANAGEMENT OF A GLOBAL LINK CONTROL BYTE IN AN INPUT/OUTPUT SUBSYSTEM

BACKGROUND OF THE INVENTION

1. Field of the Invention

This invention relates to communication between chips in a mainframe Input/Output (I/O) subsystem, and more particularly relates to queue management of a queue of global Link Control words (LCWs) in an I/O subsystem.

2. Description of Background

In many data processing systems such as the IBM S/390 and the IBM eServer zSeries 990 server, the I/O subsystem used the Self-Timed Interface (STI) to transmit data between chips. The STI protocol allows communication between chips in the system, not only via information packets, but also via smaller global LCWs.

U.S. Pat. No. 5,272,702 issued Dec. 21, 1993 to Snowbarger et al. for INTEGRITY MAPPING IN DATA COMMUNICATION SYSTEMS discloses a device for communicating with other devices over a communication system. The system includes a segment reporter device and non segment reporter devices. The device, if not a segment reporter, transmits report messages back to the segment reporter device, and monitors the segment reporter device in order to assume its duties of the segment reporter device fails.

U.S. Pat. No. 5,455,831 issued Oct. 3, 1995 to Bartow et al. for FRAME GROUP TRANSMISSION AND RECEPTION FOR PARALLEL/SERIAL BUSES discloses asynchronously transmitting data blocks, in parallel, across multiple fibers in a serial manner in frames.

U.S. Pat. No. 5,610,945 issued Mar. 11, 1997 to Gregg et al. for SYSTEM FOR IDENTIFYING COMMUNICATION SEQUESCES TRANSMITTED ACROSS MULTIPLE CARRIERS BY EXAMINING BIT STREAMS FOR SEQUENCES OF VALID WORDS discloses asynchronously receiving data blocks transmitted in frames, in parallel across multiple fibers of a link in a serial manner by receive buffers. The receive buffers include states which inhibit erroneously generated frames from corrupting the buffers after errors on the link.

U.S. Pat. No. 5,649,291 issued Jul. 15, 1997 to Tayloe for COMMUNICATION SYSTEM AND METHOD USING SUBSCRIBER UNITS TO EVALUATE HAND-OFF CANDIDATES discloses a cellular telecommunication network having earth orbiting satellites. Each satellite receives cell cluster lists that are valid for cells the satellite projects toward the earth and for predetermined periods of time.

U.S. Pat. No. 5,944,797 issued Aug. 31, 1999 to Gregg et al. for DATA MOVER HARDWARE CONTROLLED PROCESSING IN A COMMANDING SYSTEM AND IN A COMMANDED SYSTEM FOR CONTROLLING FRAME COMMUNICATIONS ON A LINK discloses an I/O system that reduces or eliminates the involvement of central processors in the message block handling of received communication-link responses within a central processing complex.

U.S. Pat. No. 5,948,060 issued Sep. 7, 1999 to Gregg et al. for SPEEDING-UP COMMUNICATION RATES ON LINKS TRANSFERRING DATA STRUCTURES BY A METHOD OF HANDLING SCATTER/GATHER OF STORAGE BLOCKS IN COMMANDED COMPUTER SYSTEMS and discloses a system which speeds up a commanded system to read or write data for a large number of data frames transmitted on a link.

SUMMARY OF THE INVENTION

The present invention defines the global LCW in such a way that handling a lost global LCW and providing ease of recovery is improved.

The present invention further provides for the ability to debug the system when the global information is not lost.

The present invention provides a system wherein throughput of global LCWs is increased in a design where under normal operating conditions, the information would have been lost.

The present invention provides a system wherein recoverability is increased.

The present invention provides all of these benefits and advantages without major system changes or increased design complexity of the system hardware, firmware or operating system.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings:

FIG. 7 is an illustration of the program flow for combining two global LCWs into one LCW; and FIG. 8 is an illustration of the program flow not combining one LCW while combining three other LCWs into a single combined LCW.

The detailed description explains the preferred embodiments of the invention, together with advantages and features, by way of example with reference to the drawings.

DETAILED DESCRIPTION OF THE INVENTION

Figure 1:
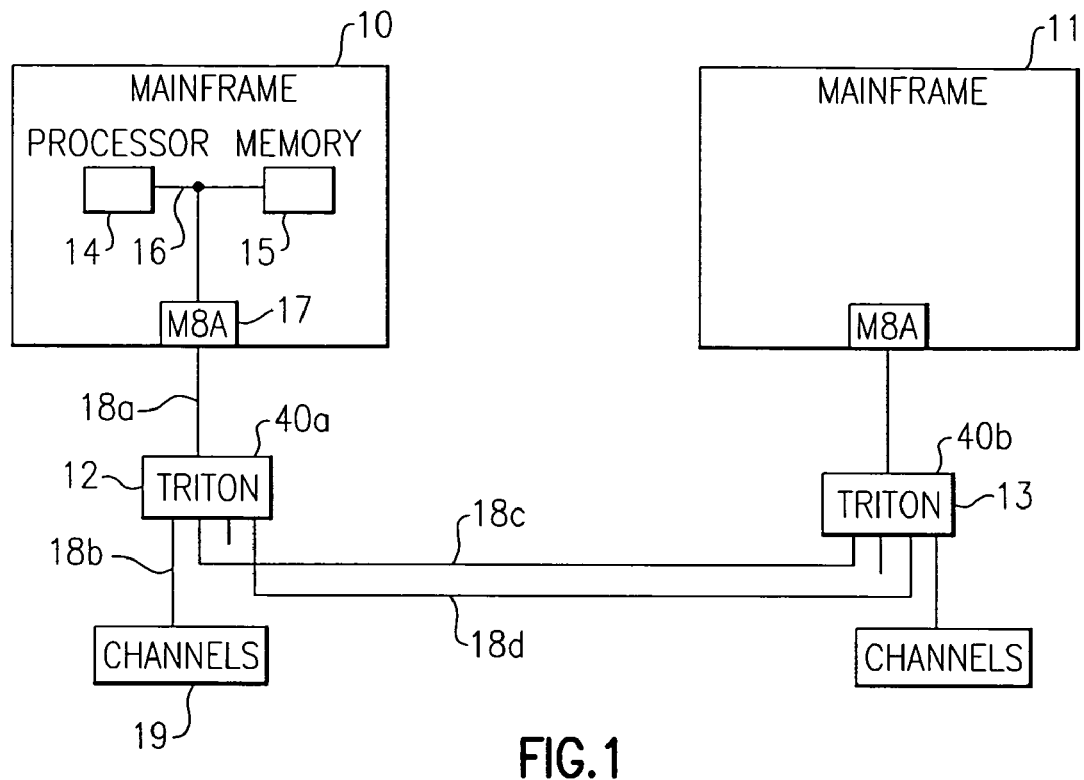
FIG. 1 is a schematic diagram of mainframe computers having I/O subsystems which use the STI to transmit data and LCWs between chips.

FIG. 1 is a schematic diagram of mainframe computers 10 and 11, each having I/O subsystems 12 and 13 usable with the present invention. Each mainframe computer, for instance mainframe computer 10, has a processor 14 and a memory 15 joined by a memory bus 16. A memory bus adapter (MBA) 17 is connected to the memory 16 and is also connected to a TRITON chip 40a by a Self-Timed Interface (STI) bus 18a. The chip 40a is connected to other chips such as channels 19 by STI bus 18b, or to other chips, such as a TRITON chip 40b which is part of the mainframe computer system 11 by further STI buses 18c and 18d. The subsystem uses the STI buses 18a-18d to transmit data between the chips. The STI protocol allows communication between chips in a system not only via information packets, but also via smaller Global Link Control Words (Global LCWs). The STI is disclosed in U.S. Pat. No. 5,568,526 assigned to the assignee of the present, and is incorporated herein by reference.

Figure 2:
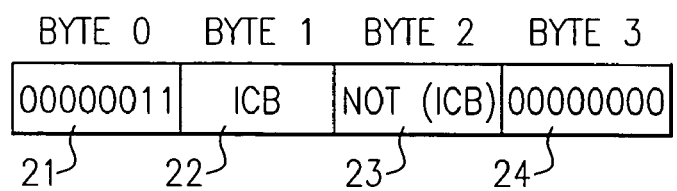
FIG. 2 illustrates a global LCW transmitted in the subsystem of FIG. 1.

FIG. 2 is an illustration of a Global LCW having four bytes 21, 22, 23 and 24. Byte 1, (22)1 is the Link Control Byte (LCB), and Byte 2 (23) is the complement of the LCB (not LCB). When an STI link macro receives a Global LCW from the STI link, Byte 1 of the message is passed to the Global host logic of this chip for interpretation. Similarly, when the host logic of this chip would like to transmit information to another chip, the host logic of this chip provides Byte 1 of the Global LCW to the STI Link Macro. The STI Link Macro encodes the byte into an LCW and transmits the word across the STI Link, as is well known.

Figure 3:
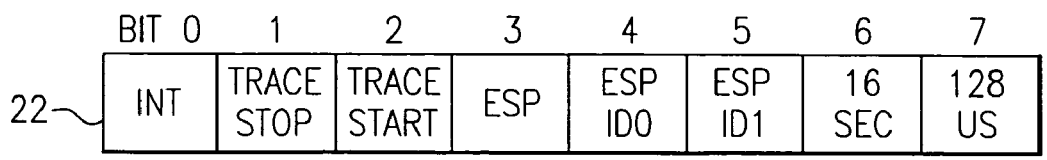
FIG. 3 illustrates a Link Control Byte (LCB) of the LCW of FIG. 2.

As the subsystem implements the STI protocol, the subsystem defines the LCB field of the LCW. FIG. 3 illustrates the LCB 22 of the LCW as follows:

Bit 1: Interrupt to the system processor.
Bit 2: Signal to all functional Chips in the system to trace no more data packets.
Bit 3: Signal to all functional chips in the system to begin tracing data packets,
Bit 4; 5: Indicates which secondary functional chip has interface problems with this functional chip (interpreted when bit 3 is active).
Bit 6: System "heartbeat", sent approximately every 16 seconds. It is used for communication between processors of different systems to indicate that the STI link is functioning and all is good between systems.
Bit 7: System "heartbeat", send approximately every 128 microseconds. It is used similarly to bit 6.

Global LCWs are generally used as a recovery and debug tool, however recovery and debug can be accomplished when a Global LCW is lost. When the Global LCW is not lost, recovery and the ability to debug are maximized. The present invention combines two LCBs, when possible, by accumulating the bits that are equal to "1" for two serial bytes into one byte, and transmitting the accumulated information in one LCW instead of two, thereby increasing the throughput of the information transmitted via the Global LCW logic. It will be understood that the combined LCBs maintain the shape of the signal as they appear as a DC signal. In other words, the transitions from '1' to '0'and from '0'to '1' is not be lost on a per bit basis.

In the present invention, the Global LCW which would normally be DC signals on wires, is represented as bits in serial packets, as shown in FIG. 2. If bits 0, 6 and 7 are equal to '1', two Global LCWs can be combined. Bits 1 and 2 can never be set to '1' at the same time in the same LCB. In other words, either bit 1 or bit 2 can be turned on, but not both bits 1 and 2 at the same time. Two Global LCWs cannot be combined if bit 3 is set and bits 3, 4 and 5 are not identical. Otherwise, they can be combined.

Figure 4:
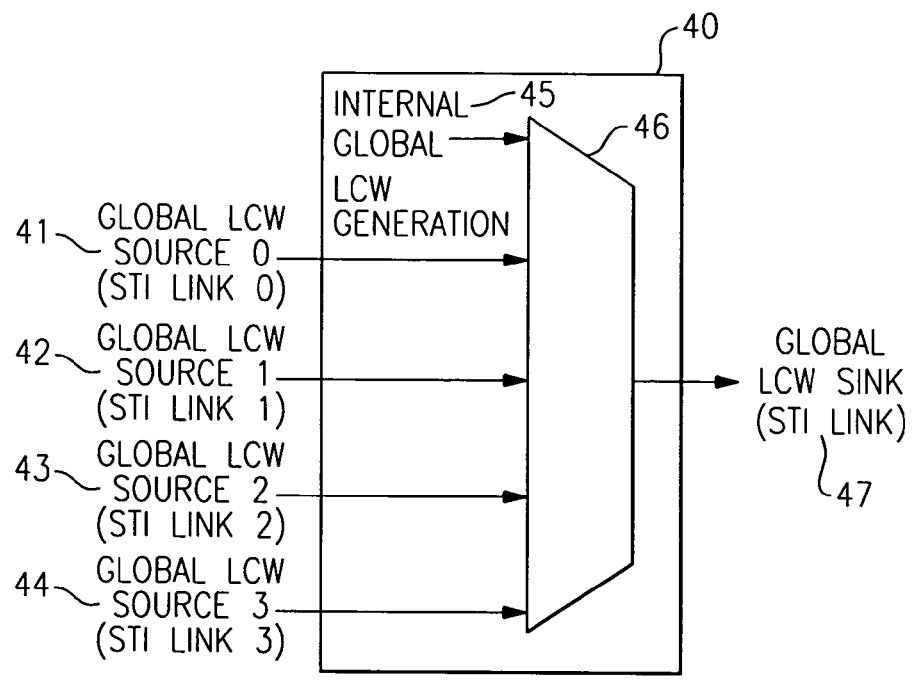
FIG. 4 is a schematic diagram of one of the chips of FIG. 1.

FIG. 4 is a schematic diagram of a portion of a chip 40 of the present invention. Chip 40 has four ports for receiving Global LCWs; STI Link 0 (41) from source O, STI Link 1 (42) from source 1, STI Link 2 (43) from source 2, and STI Link 3 (44) from source 3. In addition, the chip 40 has in internal Global LCW generation circuit 45 for generating an internal Global LCW to report on the status of the chip 40. The Global LCWs from STI Links 41-44 and the internal Global LCW from internal circuit 45 are combined by a combiner 46, and sent to a Global LCW sink port on STI Link 47.

Figure 5:
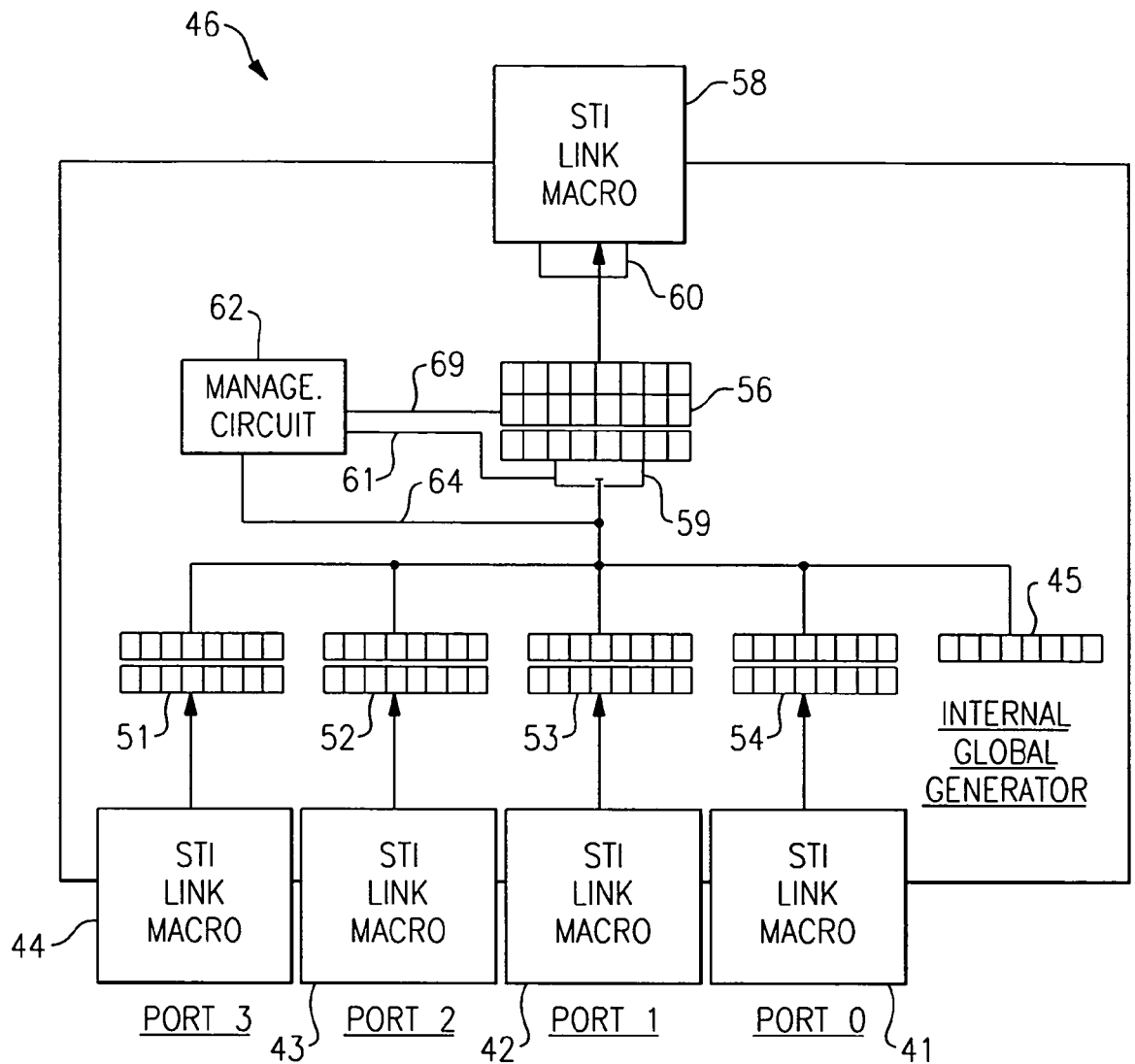
FIG. 5 is an illustration of the queue implementation of the chip of FIG. 4.

FIG. 5 is a schematic diagram of the combining circuit 46 of FIG. 4. The ports 41-44 include Link Macros for placing the Global LCW received at each port to a respective one of four FIFO queues 51, 52, 53 and 54. These FIFOs are in turn connected with a Global queue FIFO 56 along with the internal Global LCW generator 45. The Global queue 56 holds three pending Global LCWs. The Global queue FIFO 56 is connected to an SIT Link Macro 58 which provides the Global LCW sink on STI link 47. The present invention manages the output of the Global queue 56 with a management circuit 62 by taking advantage of the additive properties of the Global LCW LCB discussed in connection with FIGS. 2 and 3 by combining two queue entries whenever possible, thereby allowing the system to free up one element of the Global queue FIFO 56.

The queue interface 59 exactly matches the STI Macro interface 60 with the addition of an enable/disable control bit 61. The control bit 61 controls whether or not the Global LCWs will be combined in the queue 56, or if the queue 56 will be used as a simple FIFO. The control line 69 is used by the management circuit 62 to indicate if the LCW should be stored in a new element or combined with an element already in the queue 56.

Figure 6:
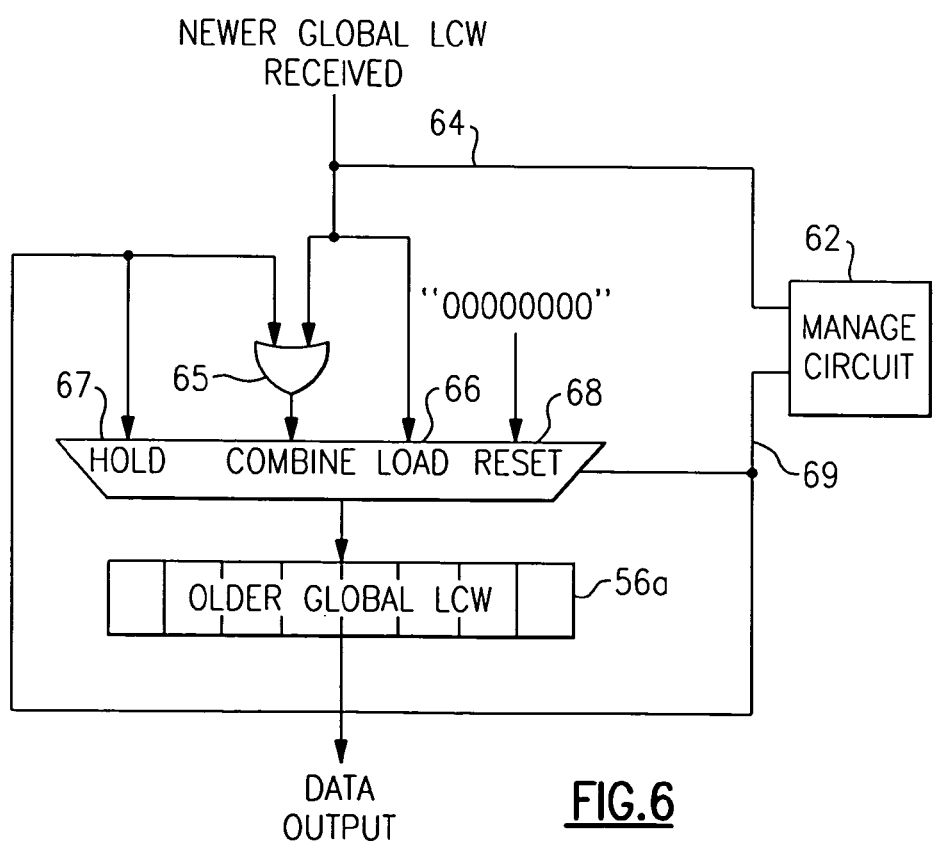
FIG. 6 is a schematic diagram of the global LCW queue implementation showing details the chip of FIG. 4.

FIG. 6 is a schematic diagram of one of the three elements of the Global queue FIFO 56. At input 64 a newer Global LCW is received by the management circuit 62 as well as the Global queue 56. The management circuit 62 must determine if the newer Global LCW is to be combined with the older Global LCW in one element 56a of the Global queue FIFO 56 by OR function 65, loaded by Load function 66 in the next element of the Global queue FIFO 56, or held at 67 until a new element in the Global queue FIFO 56 is available. The management circuit 62 also has a reset function 68 for resetting the used element in the Global queue FIFO 56 if the data in the used element is outputted.

FIG. 7 is an illustration of the program flow from 70 to 72 for combining two LCWs into one LCW. The receipt of a global LCW is shown at 70 wherein an element 56a of the global queue 56 receives a global LCW as discussed in connection with FIG. 6. At 71, a second LCW is received by the management circuit 62. As discussed in connection with FIG. 6, the management circuit 62 determines that the LCW received at 70 can be combined with the LCW received at 71. At 72, the LCWs have been combined, and the combined LCWs are placed into element 56a of Global queue 56.

FIG. 8 is an illustration of the program flow from 80 to 83 wherein one LCW is not combinable with other LCWs, and wherein three LCWs are combined into one LCW. At 80, first and second LCWs are received and stored in elements 56a and 56b, it having been determined by management circuit 62 that the first and second LCWs are not combinable. At 81, the first and second LCWs remain in elements 56a and 56b, and a third LCW is received. As discussed, it is determined that the second and third LCWs are combinable. At 82, the second and third LCWs are combined into element 56b. A fourth LCW is received. It is then determined that the combined LCW in element 56b is further combinable with the fourth received LCW. At 83, the combined second, third and fourth LCWs are placed in element 56b, and element 56c is free to receive still another LCW. It will thus be understood that LCWs may be combined to make more efficient use of a global queue without losing any information, as discussed.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for communicating global link control words (LCW) between chips, said method comprising:
    storing an LCW in a queue, said queue having an input for receiving an LCW from a previous chip, and an output for outputting a stored LCW to a subsequent chip;
    comparing with a management circuit, an incoming LCW with a previously stored LCW; and
    combining the incoming LCW with a previously stored LCW and storing the combined LCW in said queue when said management circuit determines that the incoming LCW can be combined with the previously stored LCW such that more than one LCW are combined into a combined LCE; and
    storing the combined LCWs in an element of said queue.

2. The method according to claim 1 further comprising storing in a separate element of said queue, said incoming LCW when it is determined in said determining step that the incoming LCW cannot be combined with the previously stored LCW.

3. The method according to claim 1 wherein each LCW comprises bits and said combining step comprises combining the bits of said incoming LCW with the bits of said previously stored LCW with an OR circuit.

4. The method according to claim 3 further comprising placing a control bit in a first state by said management circuit indicating that the incoming LCW cannot be combined with another LCW previously stored in said queue for controlling storing said incoming LCW in a separate element in said queue, and placing said control bit in a second state by said management circuit indicating said incoming LCW can be combined with another LCW previously stored in said queue.

5. The method according to claim 3 wherein at least two selected bits of said LCWs have an Exclusive OR relationship wherein either of the bits may be on, but not both, and said combining step comprises preventing the combining of two LCWs if the Exclusive OR relationship is violated.

* * * * *